Patented June 15, 1943

2,321,626

UNITED STATES PATENT OFFICE 2,321,626

OIL-SOLUBLE PHENOLIC RESIN AND METHOD OF PREPARING SAME

Israel Rosenblum, New York, N. Y.

No Drawing. Application August 19, 1938,
Serial No. 225,722

12 Claims. (Cl. 260—25)

My invention relates to the production of lacquer, varnish and other coating compositions, more particularly of varnish oil-soluble, fusible, resinous phenolic condensates, and especially of fusible phenol-aldehyde condensates which have been rendered oil-soluble without the aid of rosin, ester gum, or other fresh or fossil natural resins or their esters.

The present application is a continuation in part of my prior applications Ser. No. 538,248, filed May 18, 1931; Ser. No. 580,495 filed December 11, 1931; Ser No. 594,379 filed February 20, 1932; and Ser No. 628,298 filed August 11, 1932.

Phenol-aldehyde and ketone condensates, such as phenol-formaldehyde resins, are, even in the fusible stage, not soluble as such in the drying, semi-drying and non-drying oils commonly employed in varnish manufacture when the ratio of formaldehyde, for example, exceeds about 0.4 mol to 1 mol of phenol. Such resinous phenolic condensates have heretofore been made oil-soluble by mixing or incorporating therewith a preponderating quantity of a natural resin, such as rosin, or of ester gum, i. e. the glycerol esters of natural resins, which are oil-soluble. The amount of phenolic resin that can be mixed with such solubilizing agents is, however, comparatively small, and larger quantities of phenolic resin tend to convert the mixture into a mass that is difficultly soluble or is insoluble in oils, particularly when the molecular ratio of the carbonyl or reactive methylene-containing body, such as formaldehyde, to the phenol exceeds 1.25 to 1 in the presence of a catalytic agent.

I have found that when the phenol or phenol and aldehyde are caused to react with, or when the phenolic resin is produced in the presence of, a terpene hydrocarbon, preferably one of higher boiling point than turpentine, such as dipentene, or non-resinous terpene derivatives, such as terpene or alicyclic alcohols, or mixtures thereof, a fusible, oil-soluble resin may readily be obtained even with the use of comparatively large quantities of the carbonyl-containing body (aldehyde or ketone). If the proportions of the reacting ingredients are properly chosen, and unreacted volatile material is driven off, the resin so produced will be solid at room temperatures and will remain indefinitely fusible and will retain its oil-soluble character even after prolonged heating at high temperatures.

The reaction is preferably carried out in the presence of both the terpene alcohol and a terpene hydrocarbon, such as dipentene, the latter compound having very desirable solvent properties during the early stage in addition to taking part in the reaction. This hydrocarbon is present in commercial terpineol or alpha-terpineol, which is the terpene alchol I prefer to employ. I may thus condense a phenol and a carbonyl-containing body, preferably formaldehyde, in the presence of alpha-terpineol, or of borneol, and dipentene. The products obtained by me may be liquid, semi-solid or plastic, or solid at room temperature. In the first case, the product is a lacquer composition, but it may be incorporated in or combined with vegetable or animal oils to produce varnishes. In producing the lacquer composition, it is important to employ reaction conditions favorable to a high degree of condensation if a composition capable of yielding a satisfactorily hard film is to be obtained; and it is one of my discoveries, upon which the present invention is based, that under the influence of the terpene material the phenol and aldehyde can be heated to yield a soluble film-forming composition in such proportions and under such conditions as would ordinarily yield an insoluble material (in the absence of the terpene material). Accordingly, when a liquid lacquer composition is to be produced, the reaction should be conducted in the presence of a catalyst to insure the formation of a high molecular condensate or polymer, any excess liquid terpene being driven off so as to leave a liquid composition having sufficient body to form a film which remains on the coated surface even when heated in the vertical position. To some extent, heating to high temperatures (of the order of 130°–250° C.) for long periods of time (12 to 20 hours and even more) will bring about the formation of a film-producing lacquer composition without the aid of an added catalyst, but the use of the latter is advantageous and from the commercial standpoint generally necessary.

For the production of solid resins, the reaction product is heated to high temperatures to expel substantially all unreacted terpene material. The expulsion may be effected with the aid of steam. Where the proportion of formaldehyde is very high, and a phenol is used (such as ordinary phenol or cresol) which readily forms insoluble materials therewith, the proportion of terpene material being relatively low, the reaction mass should be heated to only moderate temperatures, such as 130° C. to effect dehydration; the plastic mass so obtained can then be mixed with solvents, including varnish oils, to produce coating compositions which can be heated to high temperatures to form hard, lustrous, durable films.

A very hard resin may be obtained by effecting the condensation in the presence of a metal compound such as the oxide, hydroxide, carbonate, acetate, oleate, stearate, palmitate, tungate, linoleate, benzoate, abietate, etc., of the metals of the second group of the periodic system (zinc and calcium being preferred), lead, nickel, cobalt and manganese; the corresponding alkali metal salts and also free acids, like hydrochloric, may also be used, but I prefer to employ the zinc and calcium compounds, both inorganic and organic. Various metal compounds which are decomposed in the presence of, for example, abietic acid to form resinates, may also be used.

Although I may use the terpene alcohols in their more or less pure state, I may employ also the high-boiling oils obtained by the distillation of various kinds of terpene-bearing woods. Very satisfactory results are secured by the use of pine oil which is obtained by the steam distillation of stump rosin and boils between about 200° and 225° C. This oil contains about 70 to 75% of alpha-terpineol, 15 to 20% of borneol and about 10% of dipentene, with small amounts of other hydroaromatic alcohols. These terpene alcohols and the dipentene are the major components of pine oil and are the compounds embraced by the expression "major components of pine oil" employed in certain of the claims.

As the phenol, there may be employed ordinary phenol (hydroxy-benzene), cresol, resorcinol, naphthol, diphenylhydroxide (phenyl phenol), butyl and amyl phenols, and equivalent alkyl substituted phenols, etc., or mixtures of phenols.

According to the present invention I may thus obtain oil-soluble phenolic resins which contain no natural resin or ester gum. While the exact nature of the effect of the terpene compound is obscure, it appears that my improved resin is at least in part the product of the condensation of the formaldehyde (or its equivalent) with the reaction product of the phenol and the terpene compound. When the phenol, formaldehyde and terpene compound are heated together, the phenol is free to react with the terpene compound as well as with the formaldehyde; while the initially formed phenol-formaldehyde condensate may also react with such compound. The final, oil-soluble product may thus be obtained by different orders of reaction; thus the phenol and formaldehyde may first be condensed to the fusible, although oil-insoluble, resinous condition, and then reacted with the terpene compound; or the latter may first be combined with the phenol with the aid of a known catalyst (preferably a chloride, like zinc, aluminum or hydrogen chloride) to produce a terpene-substituted phenol or to more or less the resinous condition, and then reacted with an aldehyde; or all the materials may be reacted simultaneously. In each case, a considerable proportion of the terpene compound (from 10 to about 25% and perhaps even more, based on the total weight of resin) may be chemically incorporated in the product.

My improved resins are compatible with natural resins such as colophony and with their esters and may be mixed therewith, or such compounds may be present during the condensation of the phenol and the carbonyl-containing body, although their presence is not necessary for the oil-solubility of the product.

The use of the terpene materials is of advantage even with phenols which ordinarily yield oil-soluble resins with formaldehyde, for they not only increase the yield of resin, but they facilitate control of the reactions and reduce the potential reactivity of the products.

In the practice of my invention I may employ extraordinarily high proportions of aldehyde or other carbonyl-containing bodies which in the absence of the terpene compound, particularly the alcohol, would produce infusible and insoluble resins. When incorporated with wood-oil by being heated with the latter to about 250–260° C., my improved resin yields a varnish which is highly water-proof and alkali proof and also extremely weather resistant.

When the molecular proportion of aldehyde, preferably formaldehyde, or of ketone or of mixtures of these substances to the phenol exceeds 1.25 to 1, the reaction between the phenol and aldehyde in the presence of the terpene alcohol should be stopped at the stage which yields a product which is pasty at ordinary temperatures; to carry the reaction further when such large proportion of formaldehyde is present might lead to the insoluble stage. To obtain a solid end product containing a phenol-formaldehyde condensate having such a high content of aldehyde (and/or ketone), I may add any suitable solid diluent compatible with such condensate, such as fresh or fossil natural resins, ester gums, phthalic anhydride-glycerol-fatty acid compounds, etc. Where a diluent is employed which has free acid, such as abietic acid, the same may be neutralized by means of an alcohol, such as glycerol, glycol, mannitol, arabitol, etc. or with a metal oxide or hydroxide, such as calcium oxide, to a limited extent.

The terpineol or other terpene alcohol, or the pine oil or dipentene may, as already indicated, be added to a fusible, oil-insoluble, phenol-aldehyde (or ketone) resin and heated therewith, or it may be heated with an infusible, insoluble phenol-aldehyde (or ketone) resin or mixture of such resins to render the same oil-soluble.

I have found further that the oil-solubilizing property of the hydroaromatic or terpene compounds, and particularly of the hydroaromatic alcohols, is manifested also with other types of synthetic resins, among which may be mentioned those produced from substituted phenols in general and reactive methylene-containing compounds; phthalic acid-glycerol resins (including those in which part of the phthalic acid is replaced by other acids, such as succinic, maleic, fumaric and other known acids used in such resins); resins produced by reacting a phenol, a ketone and formaldehyde, in any order; and cycloketone resins, particularly those produced with formaldehyde; the resin being rendered soluble in oil even when the proportions of the reacting compounds are such as would ordinarily yield infusible or potentially reactive resins (i. e. convertible into the infusible state upon further heating).

Where I employ a substituted phenol, I prefer to employ a phenol which is substituted in the para position; the meta- and ortho-substituted phenols usually do not produce as good results. The substituting groups may be alkyl, aryl, aralkyl or other organic group. The substituted phenols may be used either in the pure form or in the commercially available state, or they may be mixed with considerable quantities of ordinary phenol, such mixtures being usually obtained as the crude product in the manufacture of the substituted phenols from ordinary phenol. Among the substituted phenols that may be used may be mentioned p-tertiary butyl phenol, p-tertiary amyl phenol, p-phenyl phenol, and p-benzyl phenol.

It has already been suggested that oil-soluble condensates may be obtained by reacting formaldehyde with para-substituted phenols, specifically p-tertiary butyl phenol and p-tertiary amyl phenol (see United States patent to Honel No. 1,800,295). In such process, however, where the formaldehyde is present in more than equimolecular proportion, the product is potentially reactive and will pass into the insoluble and infusible stage upon heating to elevated temperatures, particularly when catalysts are used. For producing more or less permanently fusible products, less than equimolecular proportions of formaldehyde must be employed in such known process.

By the use of the hydroaromatic compounds above set forth, I am able to produce oil-soluble and more or less permanently fusible substituted phenol resins, cyclic ketone resins, phthalic acid resins, etc., under conditions under which without such compounds insoluble or useless products would result. Particularly is this true in connection with the proportion of aldehyde to phenol, or ketone, for in accordance with the present invention, I may employ far larger proportions of formaldehyde (or other aldehyde) than have heretofore been utilized and still obtain practically permanently fusible and oil-soluble products. Any of the above-mentioned catalysts, or any known catalysts, may be used.

If desired, the reaction may be conducted in the presence of a diluting or fluxing agent which is compatible, i. e., miscible, with the phenolic resin and forms part of the final product; among these substances may be mentioned natural resins and their esters, or mixtures thereof, coumarone and other artificial resins, including fusible phthalic acid-glycerol resins of all kinds; pitches, fats, oils and waxes, etc. Where the final product is acidic, it may be neutralized in any suitable manner, as by means of glycerol or other alcohols, preferably polyhydric; if desired, the neutralizing agent may be present during the initial reactions.

As I have indicated above, the pine oil may itself be used or, instead, any one of its components, such as alpha-terpineol, borneol or dipentene may be employed in the more or less pure or commercial state. I have obtained very satisfactory results with alpha-terpineol, with or without a hydroaromatic or terpene hydrocarbon, such as dipentene, while dipentene alone may be used, especially if present in somewhat higher proportions. I have found that although, as set forth in the above-mentioned patent, the use of two mols of formaldehyde per mol of, for example, p-tertiary amyl phenol with NaOH as the catalyst, produces potentially reactive or infusible products, there may be employed, with the simultaneous use of, for example, alpha-terpineol or dipentene, as much as 4 mols and even more of formaldehyde per mol of the substituted phenolic compound and yet produce clear resinous products which are permanently fusible and dissolve completely in oil. Moreover, by the use of such hydroaromatic compound, I can convert oil-insoluble synthetic resins, such as the oil-insoluble products obtained by condensing substituted phenols with high proportions of aldehyde, into oil-soluble materials. I have further discovered that the oil-solubilizing property of the hydroaromatic compounds employed by me is much greater than that of the compounds which have heretofore been employed for such purpose in connection with phenol resins, the more usual of such compounds being rosin and rosin esters; in fact, oil-soluble products have been obtained by me, with the aid of hydroaromatic compounds, with phenol-formaldehyde condensates of the type above mentioned, under conditions which yielded insoluble or unsatisfactory products with quantities of rosin or of the glycerol ester thereof corresponding to the quantity of hydroaromatic compounds.

I have found that, in general, mixtures of phenol and/or cresol (both of which yield oil-insoluble resins when any considerable amount of reactive methylene-containing compound is reacted therewith) with phenols which ordinarily yield oil-soluble resins with a reactive methylene-containing body (such phenols comprising substituted phenols, the substituting group or groups being aryl, aralkyl, or alkyl radicals having a plurality of carbon atoms, e. g., phenyl phenol, benzyl phenol, and amyl phenol), will produce oil-insoluble resins with, for example, formaldehyde, which resins char on heating with oil to about 200–250° C. even when the ordinary phenol and cresol comprises as little as 25% of the total phenols. Whether the product is also infusible will depend on the proportion of aldehyde and upon the degree of heating. Upon reaction with alpha-terpineol, such mixtures yield resins which dissolve readily on heating with oils.

The resins and resinous compositions obtained by me have the desirable characteristic that they will form gas-proof varnishes with China-wood oil and also long oil varnishes, i. e., varnishes having a high proportion of oil to resin.

I have found further that resins having the property just described and characterized also by a low acid number (about 15) can be obtained by the use of solid, or non-aqueous, in place of aqueous aldehyde. Thus, according to this further development of the invention, a phenol, and especially phenols substituted, preferably in the para position, by an aliphatic radical of more than two carbon atoms, or by an aromatic radical, is caused to condense with a solid, polymerized aldehyde, such as solid formaldehyde, in the presence of a hydroaromatic compound; I prefer to employ a hydroaromatic compound of high boiling point, say above 170° C., although my process is not limited thereon. By the use of a solid aldehyde, and particularly solid formaldehyde, considerably lower acid values are obtained than when the liquid, i. e., aqueous aldehyde is employed especially when hydroaromatic compounds of high boiling point are used, such as terpineol or other hydroaromatic alcohol, dipentene, or the mixture known commercially as pine oil.

Thus, I have found that if amyl phenol is condensed with solid formaldehyde in the proportion of one mol of the phenol to 2½ to 4 mols of the aldehyde in the presence of, for example, terpineol, the mass can be heated to about 250° C. or above and a fusible, soluble resin will be obtained having an acid number of about 15 to 18. If no terpineol is employed, the acid number of the condensate falls only to a value of about 40–60 depending on the quantity of formaldehyde employed, and the product tends to become viscous and rubbery at temperatures above 170° C. when about 2 mols or more of formaldehyde are used per mol of amyl phenol, especially when a catalyst is present, which favors the absorption of formaldehyde, and finally decomposition sets in. Similarly, when aqueous formaldehyde is employed together with terpineol the acid value obtainable under practical conditions is about 40. In the absence of terpineol a rubbery, more or less infusible mass would be obtained with the use of aqueous formaldehyde, the product being even more rubbery when solid formaldehyde is used in the absence of terpineol. Where, however, terpineol is used together with solid formaldehyde there is obtained a fusible, soluble resin of low acid number which is solid at room temperature and is stable at elevated temperatures even with extraordinarily large ratios of formaldehyde to phenol, the mass remaining fluid even when heated as high as 250° C. and above and even in the presence of small amounts of catalyst. Thus when 1 mol of amyl phenol and 2½ mols of solid formaldehyde are condensed in the presence of a small quantity of ZnO (¼% based on the quantity of phenol) in the absence of the hydroaromatic compound, the reaction proceeds satisfactorily up to about 160° C., the mass remaining sufficiently mobile for pouring. At about 165–170° C., however, an exothermic reaction takes place with violent foaming. The whole mass becomes rubbery and the more it is heated the more rubbery it becomes and can no longer be poured. From 170° to 260° the acid value varies between 60 to 50. The product is oil-soluble, but local overheating due to the rubberiness of the mass, which is a poor conductor of heat, soon causes decomposition. When terpineol is present, however, the mass is liquid at 250° and the acid value is decreased. This decrease in acid value is due, as above indicated, in large part to the solid formaldehyde. It is probable that with the solid formaldehyde para-formaldehyde, in the presence of the hydroaromatic compound, a higher degree of polymerization is obtained which is characterized by a lower acid number.

The reactions may take place in the presence also of inert solvents, like mineral spirits, which are expelled during the course of the heating. With ordinary phenol (carbolic acid) lower proportions of solid formaldehyde paraformaldehyde must be employed to prevent the product from becoming infusible. With a substituted phenol, such as 4 amyl phenol, on the other hand, as much as 4 molecules of formaldehyde to one of the phenol may be used if a hydroaromatic compound such as terpineol is simultaneously employed. Ordinary phenol or cresol may be mixed with a substituted phenol, the quantity of formaldehyde then rising with the proportion of the substituted phenol.

The remarkable solubilizing property of the terpene compounds, including the alicyclic alcohols, and particularly of alpha-terpineol, and also dipentene, either individually or in the form of commercial alpha-terpineol or of pine oil, is demonstrated by the following examples:

*Example 1*

| | Parts |
|---|---|
| Phenol | 400 |
| 40% formaldehyde solution | 200 |
| Alpha-terpineol | 300 |
| Zinc acetate, corresponding to about 1 part of zinc oxide | 3 | were heated at 95–100° C. under reflux or under pressure at somewhat higher temperatures for about 24 hours, thereby producing an intermediate resinous material which is dissolved in the excess of terpineol. The mass is then dehydrated by heating to about 130–150° C. with or without vacuum, and the temperature gradually raised to 250° C., if desired, while blowing an inert gas through the mass until all the volatile matter had been driven off. A fusible, very pale gum was obtained which was readily soluble in varnish oils at low temperatures (100–150° C.).

No charring of the resin occurred even when the same was heated with the oil to 300° C.

When the same proportions of phenol, formaldehyde (i. e. about 1 mol of phenol to about 0.6 mol of formaldehyde) and zinc acetate were heated in the same manner but in the absence of alpha terpineol, a fusible resin was obtained which was not, however, soluble in oils and which charred in the oil when heated to 250–300° C.

The alpha-terpineol employed in these and in the subsequent examples was the commercial product which contains some dipentene and also some borneol.

*Example 2*

The proportions given in Example 1 are employed with the exception that only 100 parts of terpineol are used. The mixture is initially heated as in Example 1 but the temperature is gradually raised to only about 200° C. and vacuum applied to drive off volatile matter (such as traces of phenol and excess, uncombined terpineol).

*Example 3*

With the aid of alpha-terpineol it is possible to obtain an oil-soluble resin from phenol and formaldehyde in the proportions of 1 mol of phenol to about 1¼ mols of formaldehyde, such resin, in view of the fact that the terpene material appears to be joined to the phenyl radical and is thus part of a new phenol, being a 100% phenol-formaldehyde resin, as follows:

| | Grams |
|---|---|
| Phenol | 400 |
| 40% formaldehyde | 400 |
| Zinc acetate | 3 |
| Alpha-terpineol | 300 | were treated as indicated in Example 1 and yielded a solid resin which was soluble in varnish oils on heating therewith and was stable at high temperatures (about 250° C.).

In the absence of alpha-terpineol an infusible and insoluble resin is obtained, particularly if care is taken to prevent great loss of formaldehyde, the resin going over more rapidly into the infusible insoluble state in the presence of a catalyst.

*Example 4*

| | Grams |
|---|---|
| Cresol | 400 |
| 40% formaldehyde | 350 |
| Zinc acetate | 3 |
| Alpha-terpineol | 300 | were heated as indicated in Example 1 and yielded a solid, oil-soluble gum which, except for the amount of alpha-terpineol (and possibly other compounds contained in the commercial product) remaining in the final mass, was, like that of Example 2, composed entirely of the phenol-aldehyde condensate.

*Example 5*

I have found that a solid, oil-soluble resin whose true resinous ingredients are composed entirely of phenol-formaldehyde resin (the term phenol being here used generically) may be obtained with even as high a proportion (molecular) of formaldehyde to total phenols of 2:1 with the aid of alpha-terpineol when as little as about 20% of the phenols is composed of phenyl phenol (ortho or para) or of amyl phenol (ortho, meta, or para) both of which produce oil-soluble resins; whereas in the absence of the alpha-terpineol even a greatly preponderating amount of the substituted phenol over the ordinary phenol, e. g. three parts of such substituted phenol to one part of ordinary phenol, will not produce an oil-soluble resin. This difference in result is accentuated when large quantities of aldehyde are used.

| | Parts |
|---|---|
| Phenol (i. e. carbolic acid) | 200 |
| Para phenyl phenol | 67 |
| 40% formaldehyde | 380 |
| Zinc acetate | 1½ |
| Alpha-terpineol | 150 | were heated in the manner set forth in Example 1. A solid, oil-soluble resin was obtained which was stable at high temperatures (250° C.) and remained fusible. When, however, the following materials were reacted there was obtained, even before the mass was fully dehydrated, a rubbery, infusible mass which charred on heating, in spite of the fact that the phenyl phenol resin predominated:

| | Parts |
|---|---|
| Phenol | 50 |
| Para phenyl phenol | 150 |
| 40% formaldehyde | 215 |
| Zinc acetate | 1½ |

I have found that, in general, mixtures of phenol and/or cresol (both of which ordinarily yield oil-insoluble resins) and phenols which ordinarily yield oil-soluble resins with a reactive methylene-containing body (such phenols comprising substituted phenols, the substituting group or groups being aryl radicals or alkyl radicals having a plurality of carbon atoms, e. g. phenyl phenol and amyl phenol) will produce oil-insoluble resins with, for example, formaldehyde, which resins char on heating with oil to about 200–250° C. even when the phenol (carbolic acid) comprises as little as 25% of the total phenols. Whether the product is also infusible will depend on the proportion of aldehyde and upon the degree of heating. With alpha-terpineol, such mixtures yield resins which dissolve readily on heating with oils.

*Example 6*

My improved resin may in certain instances be produced without the aid of catalyst, but in such cases high temperatures and long heating are required to insure chemical reaction:

| | |
|---|---|
| Phenol, cresol, or mixture thereof mol | 1 |
| Formaldehyde (e. g. in the form of the 40% aqueous solution) mols | 1¼ |
| Alpha-terpineol based on the weight of phenol per cent | 75 | were heated under pressure at about 110° C. or under reflux at about 100° C. for 24 hours. The mass, which contained the resinous condensate in solution in the uncombined terpineol, was then dehydrated at about 130–150° C., and the temperature then gradually raised to 245–250° C., the excess of alpha terpineol being thereby expelled. The heating was continued until a fusible resin was obtained which was solid at room temperature and dissolved in varnish oils on heating therewith, in spite of the long heating at high temperatures.

*Example 7*

I have also found that a terpene or alicyclic alcohol may be employed to render phenolic condensates, such as phenol-formaldehyde resins, soluble in oil. If, for example,

| | |
|---|---|
| Phenol mols | 1 |
| Formaldehyde do | 6 |
| Zinc acetate, based on the weight of phenol (approximately) per cent | ¾ | are heated at about 100° C. under reflux or at a higher temperature under pressure for about 24 hours, a fusible phenol-formaldehyde resin being thereby produced, the water then distilled off, and the mass then gradually heated to about 200° C. under vacuum with stirring until the excess phenol has been expelled, a resinous product is obtained which is fusible but is insoluble in oil. When this product is heated with about 15–25% or more of its weight of alpha-terpineol for several hours and the excess terpineol then expelled with the aid of a vacuum at about 200–230° C., there is obtained a fusible resin which is soluble in oil.

*Example 8*

It has already been mentioned that rosin and the rosin ester of glycerol have hitherto been utilized to render phenol-aldehyde resins oil soluble, but a greatly preponderating quantity of rosin or ester must be employed. When the quantity of rosin is smaller than that of the phenol resin, the mixture is not oil-soluble. In fact, even when the rosin comprises 50% of the final product (i. e. is equal in quantity to the phenolic resin), the final resin is not oil-soluble, as is demonstrated by the following:

| | Parts |
|---|---|
| Phenol (about 4 mols) | 400 |
| 40% formaldehyde (about 8 mols) | 640 |
| Rosin | 460 |
| Zinc oxide | 1 | were heated in known manner at about 100° C. for about 24 hours. When the mass is dehydrated and the temperature raised to about 160° C., it becomes very viscous, and at a somewhat higher temperature passes into the infusible and oil-insoluble state.

With the aid of a terpene alcohol, such as terpineol, on the other hand, a fusible, oil-soluble and stable resinous product is readily obtained. In fact, oil-soluble resins are produced with the aid of terpineol even when much smaller quantities of rosin are employed than in the above reaction, that is, with quantities of rosin that would be totally unable to render the phenolic condensate oil-soluble. When, for example,

| | Parts |
|---|---|
| Phenol | 400 |
| 40% formaldehyde | 640 |
| Rosin | 160 |
| Alpha-terpineol | 300 |
| Zinc acetate | 3 | are reacted as set forth in Example 1, a gum is obtained which contains 75% of phenolic resin, is soluble in oil, and is solid at room temperature. The mass may, if desired, be neutralized, as by heating with 20 parts of glycerol at about 250° C. The glycerol may be present from the start, or an amount of ester gum equivalent to the amount of rosin may be used. Without the alpha-terpineol the resulting product is, as already indicated, insoluble in oils.

Example 9

With the aid of alpha-terpineol or equivalent alcohol, an oil-soluble resin may be obtained containing 50% of a resin produced from a mixture of 1 mol of phenol or cresol with as much as 3.3 mols of formaldehyde:

| | Parts |
|---|---|
| Phenol | 150 |
| 40% formaldehyde | 390 |
| Rosin | 188 |
| Alpha-terpineol | 112 |
| Zinc acetate | 1½ | were reacted as indicated in Example 1 and then neutralized at about 250° C. with 23 parts of glycerol. In spite of the extraordinarily large amount of formaldehyde employed, the product dissolved readily when heated with oil.

It is usually desirable to have as many carbonyl or methylene radicals present in the final product as possible. Examples 3 and 4 indicate approximately the highest proportion of aldehyde to phenol that may be employed in the presence of a catalyst and yet produce a soluble resin which is solid at room temperature. (In the absence of a catalyst, greater proportions of carbonyl or reactive methylene-containing compound may be used.) Where higher proportions of aldehyde are employed, the reaction is continued only until a gum is produced which is soft or pasty at room temperature. This gum can then be heated with oil, in which it dissolves, and in which further condensation and polymerization take place without affecting the solubility thereof, the oil acting as a diluent and preventing the progression of the polymerization to the insoluble stage.

Example 10

100 grs. of phenol, 260 grs. of formaldehyde (40% aqueous solution), and 125 grs. of a mixture of alpha-terpineol, borneol, and di-pentene, such as may be found in pine oil, and containing about 30% of borneol and dipentene, or of commercial alpha-terpineol, are heated at about 100° C. in the presence of 2 grs. of zinc acetate for about twenty hours under reflux or under pressure. The water is removed under partial vacuum at about 95° C. or at or slightly above the boiling point and the temperature is then gradually raised to about 120° C. with the use of vacuum. After a few hours heating a pasty resin is obtained which is soluble in drying, semi-drying and non-drying oils, and is also fusible and miscible with natural resins, such as rosin, and their esters.

If desired, the use of zinc acetate may be dispensed with, more vigorous and longer heating being then required, or any of the other metal compounds enumerated above may be employed. During the reaction a large part of the alicyclic alcohols and hydrocarbon are distilled off but part remains incorporated in the resinous reaction product. Any of the alicyclic compounds may be employed alone, or they may be used in the less expensive mixtures available.

Example 11

The procedure outlined in Example 10 may be followed, except that after the dehydration, 200 grs. of rosin ester are added and the temperature raised to about 240° C., or to about 200° C. with the use of vacuum, and the heating continued until a resin of the desired hardness is obtained.

Example 12

The procedure set forth in Example 10 is followed except that after the dehydration, there is added a quantity of rosin which may subsequently be neutralized with the proper quantity of polyhydric alcohol such as glycerol. As the esterification of the rosin requires a temperature of about 240° C. or above, sufficient rosin should be present to prevent the mixture from losing its fluidity at this temperature. The rosin is added to produce a gum which is solid at room temperatures; at the same time, because of its lower cost, the rosin (or rosin ester) permits the product to be sold at a lower price.

Example 13

100 grs. of an approximately equimolecular mixture of phenol (phenyl hydroxide) and diphenyl-hydroxide are condensed with 260 grs. of formaldehyde (40% solution) in the presence of 60 grs. of pine oil and heated to about 100° C. under reflux for about 21 hours or at a slightly higher temperature under pressure. The water is distilled off and the mass then heated to about 130° C. under vacuum until a resinous mass which is soluble in oil and has the desired consistency, is obtained. If desired, an organic salt of zinc or any of the other metal compounds listed above may be employed. Reaction may also take place in the presence of a natural resin (rosin, congo, kauri, copal, manila, etc.) which may subsequently be neutralized.

Example 14

One mol of p-tertiary amyl phenol is condensed with two mols of formaldehyde in the presence of a quantity of zinc acetate corresponding to about ¼%, calculated as zinc oxide, based upon the quantity of phenol or phenol and fluxing agent, if the latter is used, and 50% by weight of alpha terpineol, based upon the weight of the phenol. The condensation is made to take place at about 100° C. for about 20-24 hours under reflux, or at slightly higher temperature (say 110° C.), under pressure, after which the temperature is slowly raised to about 220-240° C. at atmospheric or sub-atmospheric pressure and maintained thereat, the volatile matter being allowed to escape until a product having the desired properties is obtained. If desired, an inert gas may be blown through the mass to aid in driving off the volatile matter. The product is solid at room temperatures, is fusible, and dissolves readily in oil without charring on heating therewith.

When the same procedure was followed in the absence of alpha-terpineol, a product was obtained which tended to decompose and darken when heated with oil.

Example 15

One mol of p-tertiary amyl phenol is condensed with four mols of formaldehyde in the presence of the same quantity of zinc acetate and alpha-terpineol as is set forth in Example 14. The procedure outlined in Example 14 is followed. A light colored resin is obtained which is soluble in oil in spite of the use of the extraordinarily large quantity of reactive methylene-containing compound.

Example 16

One mol of p-tertiary amyl phenol is reacted with two mols of formaldehyde in the presence of about 10% of sodium hydroxide, based on the weight of the phenol, a quantity of alpha terpineol equal to about 50% by weight of the phenol being present. The procedure outlined in Example 14 is in general followed with the exception that before dehydration the initial condensation product is neutralized with HCl and washed with water several times. After the dehydration and final heating a light colored product is obtained which is fusible, stable at high temperatures, and soluble in oils and may be heated to 250° C. without charring.

*Example 17*

One mol of p-tertiary amyl phenol and 3 mols of formaldehyde are reacted in the presence of zinc acetate (the quantity may be the same as that used in Example 14) and 30% by weight of alpha-terpineol based on the quantity of phenol. The reaction is violently exothermic. The initial condensate is dehydrated and further heated as set forth in Example 14 and yields a fusible resin which is soluble in oil.

*Example 18*

One mol of p-tertiary amyl phenol and two mols of formaldehyde when reacted in the presence of a small quantity of HCl as catalyst in the manner described in Example 14 yields an oil-soluble product, but the yield is comparatively lower. The yield is improved by the use of zinc acetate as the catalyst and also by the use of alpha-terpineol.

*Example 19*

Equal weights of p-tertiary amyl phenol and ordinary phenol (hydroxy-benzene) are reacted with a 40% aqueous solution of formaldehyde, in the ratio of 1¼ mols of formaldehyde to 1 mol of total phenol, in the presence of 50% of pine oil (based on the weight of the phenols) and of a quantity of zinc acetate equivalent to about 1¼%, calculated as oxide, based upon the weight of phenols. The procedure outlined in Example 14 is followed and yields a fusible resin which dissolves in varnish oils and does not char on heating. The process involves no unusual difficulties and can be easily controlled.

When the same reactions are conducted in the absence of pine oil, the mass chars when the temperature is raised after the dehydration and the process cannot be continued. When the pine oil is replaced by a quantity of rosin glycerol ester equal to 33% by weight of the total phenols, the process becomes inoperative as the mass begins to char even below 180° C. Even if 50% of rosin ester is used, it is still difficult to control the reactions and the mass chars at about 180° C. If the pine oil is replaced by 50% of rosin (likewise based upon the total weight of phenols), it is found that the reactions can be conducted in an open vessel with stirring, but considerable difficulty is encountered during dehydration.

*Example 20*

One mol of p-tertiary amyl phenol and one mol of ordinary phenol are condensed with 2¼ mols of formaldehyde in the presence of zinc acetate as the catalyst, as above described, and of a quantity of alpha-terpineol equal in weight to 50% of the total phenols, in the manner set forth in Example 14. The reactions proceed without difficulty and yield a resin which dissolves readily in oil and does not char at elevated temperatures. In the absence of the terpineol, the mass foams badly and becomes infusible before reaching 180° C. If the terpineol is replaced by an equal quantity of rosin glycerol ester, considerable difficulty is encountered, a strong foaming setting in, and the product is rubbery in nature and chars at about 180° C. If the terpineol is replaced by an equal quantity of rosin, the process proceeds satisfactorily at first, but at about 150° C., the same difficulties are encountered as with the use of the ester gum. Moreover, it is practically impossible to esterify the resulting product with glycerol.

In any of Examples 14 through 20, the p-tertiary amyl phenol may be substituted in whole or in part by equivalent quantities of other p-substituted phenols or cyclic ketones. A fluxing or diluting agent, as described hereinabove, may be present during the condensation, and where such material is acidic, as in the case of rosin, it may be neutralized in any suitable or known manner, as by means of glycerol, which may be present during the initial reaction. When such fluxing or diluting materials are present, even larger quantities of reactive methylene-containing compound may be safely used.

The following examples illustrate the use of solid formaldehyde, whereby products of lower acid number are obtained than by the use of aqueous formaldehyde:

*Example 21*

| | Parts |
|---|---|
| Paratertiary amyl phenol | 164 |
| Paraformaldehyde | 75 |
| Pine oil | 120 |
| Zinc acetate | 1 | are heated together for 12 hours at 110° C. The mass is then heated slowly up to 230° C. and kept at that temperature for 12 hours, the last four hours under vacuum. The acid number of the resin so produced is 13. It is soluble in oils and in varnish solvents, including mineral spirits. It permits the manufacture of very long wood oil varnishes, gasproofness being obtained at relatively low temperature.

The lower acid number of the product as compared with that made with aqueous formaldehyde under similar conditions (20 or higher) cannot be ascribed to the presence of formic acid in commercial formaldehyde, for aside from the fact that such formic acid content is now extremely low, the lower acid numbers are obtained with solid formaldehyde even when much larger proportion of formic acid are deliberately added thereto than occur in commercial formaldehyde.

*Example 22*

| | Parts |
|---|---|
| Paratertiary amyl phenol | 100 |
| Paraformaldehyde | 45 |
| Pine oil | 75 |
| Ester gum | 5 | are heated together for 12 hours at about 110° C. The temperature is then gradually raised to 250° and kept at such value for 12 hours, a moderate stream of inert gas being passed over the material to facilitate removal of volatile matter. ¼% or less of zinc oxide (based on the weight of phenol) may be employed as a catalyst, or an equivalent amount of zinc actate or resinate may be used.

*Example 23*

| | Parts |
|---|---|
| Paratertiary amyl phenol | 32 |
| Paraformaldehyde | 15 |
| Rosin | 72 |
| Pine oil | 32 | are heated together for 12 hours at 110–120° C. The temperature is then raised slowly to 160–180° C. and 5 parts of glycerine added. The esterification is accomplished by raising the temperature slowly to 250° and holding it there for about 12 hours. A hard pale resin is obtained, soluble in all oils employed in coating compositions and in varnish solvents. It gives excellent varnishes at relatively low temperatures. The films produced by these varnishes are tough, brilliant and of remarkable durability. An amount of zinc acetate corresponding to 0.1% ZnO based on the weight of phenol may be employed as a catalyzer in the preparation of the resin.

*Example 24*

|  | Parts |
|---|---|
| Paratertiary amyl phenol | 32 |
| Paraformaldehyde | 15 |
| Pine oil | 32 |
| Rosin | 72 | are heated for 12 hours at 110°–120° C. with an amount of zinc acetate equivalent to 0.1%, calculated as zinc oxide, of the weight of phenol. The temperature is raised slowly to 250° C. and then 5 parts of glycerine are added for esterification. The reactions are complete after heating for about 12 hours at this temperature, with or without the aid of vacuum. A resin is obtained which gives more viscous varnishes than the resin produced according to Example 23. This type of varnish requires more solvent, which is at times required by varnish users.

*Example 25*

|  | Parts |
|---|---|
| Paratertiary amyl phenol | 32 |
| Paraformaldehyde | 15 |
| Pine oil | 32 |
| "Cracked" Congo gum (oil soluble) | 72 | are heated for 12 hours at 110°–120° C. The temperature is gradually raised to 230° and maintained thereat for 12 hours, the last 6 hours under vacuum. A hard resin is obtained, soluble in oils and solvents. It is particularly suitable for the manufacture of rubbing and pale-baking varnishes.

*Example 26*

|  | Parts |
|---|---|
| Paratertiary amyl phenol | 24 |
| Paraformaldehyde | 11 |
| Pine oil | 24 |
| Rosin | 140 | are condensed for 12 hours at 110°–120° C. The temperature is then raised gradually to 160–180° C., and 13 parts of glycerine added. The temperature is then slowly increased to 250° and maintained for a period of 12 hours to complete the esterification. A small amount of zinc resinate (or acetate) can be used as a catalyzer in an amount equivalent to 0.1% of zinc oxide based on the weight of phenol. A very hard pale resin is obtained which is particularly suitable for the manufacture of durable pale air-drying varnishes.

*Example 27*

|  | Parts |
|---|---|
| Paraphenyl phenol | 170 |
| Paraformaldehyde | 75 |
| Pine oil | 150 |
| Zinc acetate | 1 | are condensed for 12 hours at 110° C. The temperature is then raised gradually to 230° C. and held there for 12 hours, the last 6 hours under vacuum. The resin obtained is of low acid number (15–18) and is suitable for the manufacture of long wood oil varnishes at relatively low temperatures.

The pine oil in some of the above examples, such as Examples 21 through 27, may be replaced by a somewhat larger quantity of turpentine, which likewise will yield fusible and oil-soluble resins. The acid number of the product will, however, be higher than when pine oil or terpineol is used. Thus, in a process according to Example 21, turpentine will give a product having an acid number of about 35–40.

In all of the above examples, more or less pure terpineol may replace all or part of the pine oil and vice versa, while dipentene may replace all or part of either of them (the dipentene being used preferably in somewhat larger quantity) with similar results. Thus, if Example 21 is followed, 120 parts terpineol or 160 parts dipentene, used in place of the 120 parts of pine oil will yield a permanently fusible and oil-soluble resin having an acid number of about 15 to 18.

While the use of formaldehyde is preferred, other aldehydes or a ketone may be used in place of all or part thereof. A ketone may first be combined with the phenol, and the product then reacted with the terpene compound and formaldehyde.

Resins produced according to my improved process are remarkably soluble in varnish oils, considering their high phenol resin and their high carbonyl compound, especially reactive methylene content. Where a resin is very high in methylene content in the absence of a diluent, such as a natural resin or derivative thereof, or a varnish oil, and particularly where a strong catalyst has been used, continued heating at elevated temperatures tends to reduce or destroy its oil-solubility, probably as a result of further condensation or polymerization; the resin is then, however, soluble in other solvents, such as benzol. A comparison of Examples 10 and 11 will show that when rosin (and/or rosin esters or any other natural resin and/or its esters) is present, the condensate may be heated safely to higher temperatures without destroying its ready oil-solubility. For instance, if in Example 11, more rosin and/or rosin esters are employed, the mixture can be safely kept for a much longer time at 240° C. so as to expel a larger proportion of the volatile ingredients; or the temperature can even be raised.

As already indicated, the product may be obtained in the form of a lacquer or in the form of a resinous material; a varnish product may be obtained by incorporating a varnish oil in the reaction mixture at any stage, preferably a latter stage, of the process.

Fusible, oil-soluble resins may similarly be obtained by reacting a cycloketone, such as cyclohexanone, in known manner with ordinary or even more than ordinary quantities of formaldehyde in the presence of a hydroaromatic compound, preferably terpineol or the mixture contained in pine oil or other oxidized hydroaromatic oils. The ketone is condensed with the aldehyde in the usual manner but in the presence of the hydroaromatic compound or compounds to produce an initial condensation product which is then, as indicated in the above examples, dehydrated at elevated temperatures and then further heated at still higher temperatures until a resin having the desired properties is obtained.

Similarly, resins of the "Glyptal" type may be obtained by condensing glycerol with phthalic acid or with phthalic acid and one or more aliphatic acids, in the presence of a hydroaromatic compound, preferably an alcohol. As these phthalic acid resins are compatible with the phenolic resins above described, they may be mixed therewith, or the phthalic resins may be present during the condensation of the phenolic resins, or the phthalic resins may be formed simultaneously with the phenolic resins in the presence of the hydroaromatic compound or compounds.

The phenolic resins above described may be produced in the presence of, or subsequently mixed with, any suitable substance or substances which are miscible therewith and do not interfere with the condensation reaction; such substances include natural resins, fresh or fossil, and their esters; cumarone and other synthetic resins, particularly glycerol-phthalic acid resins; oils, fats, waxes and their free acids, etc.

In each of the above examples the greater part of the hydroaromatic material distills over, together with the water of reaction, but an amount up to about 25% of such material based on the weight of phenol remains in the final product.

Larger proportions of solid formaldehyde than are indicated in the above examples may be employed, especially when a natural resin is present and in the absence of a catalyst. While I prefer to employ substituted phenols of the type named in the examples, such phenols may be replaced in whole or in part by ordinary phenol or cresol, in which case the amount of formaldehyde should be reduced. The safe upper limit of the aldehyde content for any particular phenol or mixture of phenols, beyond which limit rubbery or infusible products are obtained, can readily be determined by simple experiment.

Except where unusually large amounts of formaldehyde or equivalent material is employed and no extending agent like rosin is present, the resins obtained as above described are practically non-reactive, that is, the reactions are substantially complete and further heating at 250–300° C. will not reduce the fusibility or solubility of the resin to any appreciable extent by further condensation and polymerization. It is, however, within the scope of the invention to stop the heating before this state of stability is reached, the reactions then progressing when the resin is heated with oil. In such case it is usually safe to employ larger amounts of aldehyde as the oil acts as a diluent or solubilizer which arrests or retards the condensation and polymerization which, in the absence of the oil, might lead to the rubbery or infusible state.

It will be understood that the terpene material is at least in large part chemically combined in the resinous products and that in carrying out my process sufficiently high temperatures, preferably with suitable catalysts of known types, will be employed to effect such combination.

Variations from the specific details above described may be resorted to within the skill of those experienced in this art without departing from the spirit of the invention or the scope of the appended claims. Thus the proportions may be varied within wide limits, the order of heating the reacting materials may be altered, etc.

I claim:

1. The method which comprises condensing phenol and formaldehyde in the presence of pine oil and of an organic salt of zinc until a fusible, soluble resin is obtained.

2. The oil-soluble reaction product of a phenol, an aldehyde, a terpene alcohol and an organic salt of zinc.

3. The method which comprises condensing a phenol and a reactive methylene-containing body in the presence of a terpene alcohol, a catalyst and a member of the group consisting of natural resins and their esters and a mixture of a natural resin and its ester, until a fusible, soluble, homogeneous resin is obtained.

4. The method which comprises reacting a phenol and formaldehyde in the presence of pine oil and of rosin until a fusible, soluble, homogeneous resin is obtained.

5. The oil-soluble reaction product obtained by condensing a phenol and formaldehye in the presence of pine oil, a catalyst, and a member of the group consisting of natural resins and their esters and a mixture of a natural resin and its ester, until a fusible, soluble, homogeneous resin is obtained.

6. The substantially neutral, oil soluble reaction product of (1) a phenol, (2) a reactive methylene-containing body, (3) a member of the group consisting of pine oil, terpene alcohols and dipentene, (4) rosin in an amount insufficient to convert an oil-insoluble phenolic resin into an oil-soluble resin, and (5) a polyhydric alcohol.

7. A varnish oil-soluble resinous composition solid at room temperature and composed of the reaction product of (1) a phenolic material consisting at least in part of a phenol having no substituent containing more than one carbon atom, said phenolic material normally producing condensates with a reactive methylene-containing compound which are insoluble in varnish oils, (2) a reactive methylene-containing compound, (3) a member of the group consisting of natural resins and their esters, and (4) a member of the group consisting of pine oil, terpene alcohols and dipentene, the natural resin or its ester being present in an amount insufficient to render the phenolic condensate oil-soluble, in the absence of the terpene material.

8. The method which comprises reacting a phenolic material consisting at least in part of a phenol having no substituent containing more than one carbon atom, said phenolic material normally producing condensates with a reactive methylene-containing compound which are insoluble in varnish oils, and a reactive methylene-containing compound by heating the same in the presence of a member of the group consisting of natural resins and their esters in an amount insufficient by itself to render the phenolic condensate oil-soluble and of a terpene material of the group consisting of pine oil, terpene alcohols and dipentene, and then continuing the heating at increased temperature and finally distilling off the uncombined volatile matter until an oil-soluble resin substantially solid at room temperature is obtained.

9. The method of producing a composition suitable for the manufacture of coating compositions, which comprises reacting a phenolic material including ordinary phenol, an aldehyde, a polyhydric alcohol-polybasic acid resin, and a terpene compound selected from the group consisting of pine oil, terpene alcohols and dipentene, with the aid of a catalyst, until a fusible, substantially uniform resin is obtained, and finally heating the mass to expel unreacted volatile material.

10. The method which comprises reacting a phenolic material consisting at least in part of ordinary phenol, with a solid polymer of formaldehyde in the presence of a terpene material consisting primarily of terpineol, with the aid of a catalyst, and then continuing the reaction at higher temperatures to cause incorporation of at least a part of the terpineol in the resinous product and until a fusible, soluble resin which is substantially solid at room temperature is obtained.

11. The method which comprises reacting one mol of a phenol containing a substituent hydrocarbon group of at least four carbon atoms, at least about two mols of formaldehyde and a terpene alcohol in the presence of a catalyst first at a temperature of about 100° C. and then at a higher temperature, and thereafter driving off uncombined alcohol.

12. An oil-soluble resinous condensate suitable for the manufacture of durable coating compositions and obtained by chemically combining only (1) a phenol, (2) a terpenic material of the group consisting of pine oil, terpene alcohols and dipentene, and (3) formaldehyde, with the aid of a catalyst, said condensate being substantially free of uncombined terpenic material.

ISRAEL ROSENBLUM.